United States Patent
Chaniat et al.

(10) Patent No.: US 9,944,566 B2
(45) Date of Patent: Apr. 17, 2018

(54) PROCESS FOR THE MANUFACTURE OF A GROUT FOR CONCRETE

(71) Applicant: SOLETANCHE FREYSSINET, Rueil Malmaison (FR)

(72) Inventors: Alain Chaniat, Pierrelatte (FR); Didier Jean Botti, Marseilles (FR); Riad Sarraf, Querqueville (FR); Christian Honnorat, Marseilles (FR)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 434 days.

(21) Appl. No.: 14/681,795

(22) Filed: Apr. 8, 2015

(65) Prior Publication Data
US 2015/0284298 A1 Oct. 8, 2015

(30) Foreign Application Priority Data
Apr. 8, 2014 (FR) .................................. 14 53098

(51) Int. Cl.
| | | |
|---|---|---|
| *C04B 40/00* | (2006.01) | |
| *C09D 1/06* | (2006.01) | |
| *B28C 5/46* | (2006.01) | |
| *B28C 7/00* | (2006.01) | |
| *C04B 28/02* | (2006.01) | |
| *C04B 111/00* | (2006.01) | |

(52) U.S. Cl.
CPC .......... *C04B 40/0078* (2013.01); *B28C 5/468* (2013.01); *B28C 7/0038* (2013.01); *C04B 28/02* (2013.01); *C09D 1/06* (2013.01); *C04B 2111/00767* (2013.01); *Y02W 30/91* (2015.05)

(58) Field of Classification Search
CPC . C04B 28/02; C04B 40/0683; C04B 40/0078; C04B 2111/00761; C09D 1/06; B28C 5/468; B28C 7/0038
See application file for complete search history.

(56) References Cited

U.S. PATENT DOCUMENTS 3,813,460 A * 5/1974 Tardieu .................. B28B 17/02
264/28

FOREIGN PATENT DOCUMENTS

FR        2 195 184 A  *  4/1974

* cited by examiner

*Primary Examiner* — Anthony J Green
(74) *Attorney, Agent, or Firm* — Dentons US LLP

(57) ABSTRACT

The present invention relates to a process for the manufacture of a grout for concrete comprising a stage of mixing a hydraulic binder and water, characterized in that the process comprises a stage of deep freezing the water in the solid form.

10 Claims, No Drawings

PROCESS FOR THE MANUFACTURE OF A GROUT FOR CONCRETE

The present invention relates to a process for the manufacture of a grout for concrete.

It is applied in varies fields, such as the construction industry, civil engineering or the nuclear sector.

It is known that a grout for concrete is obtained by mixing a hydraulic binder, in a solid granule form, and water, in liquid form; the hydraulic binder then gradually hardens, as a result of the contact thereof with water. Practical duration of use refers to the time during which the grout is not completely hardened. The practical duration of use is variable, from a few minutes to a few days.

Such a known manufacturing process exhibits multiple disadvantages, as a result in particular of the gradual and irreversible hardening of the mixture of hydraulic binder and water.

This is because, if the grout is prepared far from the site on which it is used, for example a work site, then the transportation thereof is complex, requires at least a concrete mixer truck and implies that the grout be delivered before the end of the practical duration of use, which makes it problematic to transport it over a long distance. Furthermore, each component brought into contact with the concrete (such as concrete mixer trucks, pipes) is contaminated by the concrete and has to be cleaned, which again generates additional costs and time.

It is optionally possible to resort to the addition, to the grout, of a set retarder, the effect of which is to increase the practical duration of use. Nevertheless, the presence of such a retarder increases the amount of organic matter. Solar radiation causes this organic matter to undergo radiolysis, which produces hydrogen in gaseous form and modifies in undue fashion the properties of the concrete obtained.

Another disadvantage lies in the fact that it may be necessary to withdraw samples of the grout in order to monitor the mechanical and physicochemical properties thereof. This is the case, for example, in the nuclear sector, the storage of nuclear waste in packages by coating with concrete, where it is essential to control the properties of the coated waste. In point of fact, as a result of the hardening of the grout, such a monitoring would have to be virtually simultaneous with the manufacture of the grout, which is not always possible, and, as the physicochemical properties change with time, the tests carried out well after the coating do not make it possible to determine what were the properties at the time of the coating.

Furthermore, if grout is manufactured directly on the site of use thereof, it is possible for the water to comprise contaminating components and, in this case, the quality of the concrete obtained may prove to be mediocre.

The aim of the present invention is to overcome the disadvantages presented above.

To this end, a subject matter of the invention is a process for the manufacture of a grout for concrete comprising a stage of mixing a hydraulic binder and water, the process comprising deep freezing the water in the solid form.

By virtue of the invention, the grout can be prepared well before it is used, and be stored at a temperature sufficiently low for the water to remain in the solid form, which makes it possible to be freed from the practical duration of use.

In particular, transportation is simplified since, as the concrete is being moved in the deep frozen form, there is no risk of it starting to set. Furthermore, as long as the concrete remains in the deep frozen form, it does not contaminate the components with which it is brought into contact, which prevents lengthy and tedious cleaning operations.

Furthermore, as a result of the anticipated preparation of the grout, it is no longer necessary to resort to a set retarder.

Moreover, the characteristics of the deep frozen concrete may be known and controlled at any moment, which is particularly appropriate in the case of coated nuclear waste.

The logistics are also greatly simplified thereby, since it is possible to centralize the manufacture of the grout at just one location. This centralization of the manufacture of the grout makes it possible to ensure the quality of the concrete obtained, in particular by virtue of the possible monitoring of the quality of the water.

Other characteristics and advantages of the invention will also become apparent on reading the description which will follow and is purely illustrative.

The process for the manufacture of a grout for concrete according to the invention comprises a stage of mixing a hydraulic binder and water and is characterized in that the process comprises a stage of deep freezing the water in the solid form.

Deep freezing is understood to mean cooling water to a temperature which is sufficiently low for the water to be in the solid form.

Preferably, this temperature, referred to as temperature for deep freezing the water, is less than or equal to 0° Celsius and preferably at a temperature of less than or equal to −18° Celsius.

These low temperatures make it possible to ensure that the chemical reaction for the hydraulic setting of the binder is suspended.

The hydraulic binder is of inorganic origin and/or is a biomaterial, such as, for example, cement.

The hydraulic binder is provided in the powder form, that is to say that it is composed of solid particles.

Advantageously, the manufacturing process comprises a stage of cooling the hydraulic binder to a temperature substantially equal to the temperature for deep freezing the water. This stage makes it possible to shorten the thermalization time of the mixture comprising the hydraulic binder and the water since the water and the binder are at the same temperature.

According to a first embodiment, the water is solidified prior to the mixing stage. The solidified water is then reduced to a powder. Powder is understood to mean that the water is in the form of solid particles.

Advantageously, the water powder exhibits a particle size of the same order of magnitude as the particle size of the hydraulic binder.

Thus, the mixture between the binder and the water is a mixture of homogeneous particle size.

Alternatively, the water powder exhibits a smaller particle size than the particle size of the hydraulic binder.

In this case, it is possible more quickly to suspend the chemical reaction for setting of the hydraulic binder by the water.

The particle size of the hydraulic binder is variable and can comprise particles with a size of the order of a few hundred micrometers to less than one micrometer.

According to a second embodiment, the deep freezing stage takes place simultaneously with the mixing stage.

Thus, the chemical reaction for hydraulic setting began and is suspended by the cold, and it is the mixture of the binder and the water which is solidified.

Subsequently, the process comprises a stage of converting the solidified mixture into a powder. Powder is understood to mean that the mixture of water and of binder, already set in part, is composed of solid particles.

The stage of converting into a powder can, for example, be a grinding stage.

The manufacturing process, according to the first or according to the second embodiment, advantageously comprises a stage of addition of one or more adjuvants, such as, for example, a water repellent.

The process can comprise a stage of storing the grout at low temperature, of less than or equal to 0° Celsius, preferably of less than or equal to −18° Celsius. This stage makes possible a delayed use of the grout.

Advantageously, the manufacturing process comprises a stage of warming the solid water and hydraulic binder mixture to a temperature which is sufficiently high for the water to become liquid, this stage being subsequent to the mixing stage and to the deep freezing stage. This stage makes possible the immediate use of the liquid grout.

The grout can, for example, be warmed naturally by thermalization with the ambient air or warmed forcibly, by the action of heating rods or by infrared or microwave radiation.

Another subject matter of the present invention is a grout for concrete comprising a mixture of a hydraulic binder and water, in which the water is in the solid form.

Advantageously, as already explained, the mixture comprises one or more adjuvants.

The present invention has a particularly advantageous application in the coating and the confining of one or more materials. It is thus possible to coat nuclear waste.

This application thus makes it possible to store nuclear waste in the form of grout, the nuclear waste having been coated in the warmed grout.

The invention claimed is:

1. A process for the manufacture of a grout for concrete, comprising:
    a stage of mixing a hydraulic binder and water; and
    a stage of deep freezing the water to solid form,
    wherein the water is solidified prior to the mixing stage, the solidified water being reduced to a powder, the water powder exhibiting a particle size which is less than the particle size of the hydraulic binder.

2. The process of claim 1, in which, during the deep freezing stage, the water is maintained at a temperature of less than 0° Celsius.

3. The process of claim 1, comprising a stage of addition of an adjuvant.

4. The process of claim 1, further comprising:
    a stage of storage of the grout at low temperature of less than or equal to 0° Celsius.

5. The process of claim 1, further comprising:
    a stage of warming the solidified water and hydraulic binder mixture to a sufficiently high temperature for the water to become liquid, this stage being subsequent to the mixing stage and to the deep freezing stage.

6. A process for the manufacture of a grout according to claim 1, in which the grout is utilized for the coating of nuclear waste.

7. A process for the manufacture of a grout according to claim 1, in which during the deep freezing stage, the water is maintained at a temperature of less than or equal to −18° Celsius.

8. A process according to claim 1, comprising a stage of storage of the grout at low temperature of less than or equal to −18° Celsius.

9. A grout for concrete comprising:
    a mixture of a hydraulic binder and water in which the water is in a solid form, the solid water being reduced to a powder, the water powder exhibiting a particle size which is less than the particle size of the hydraulic binder.

10. The grout for concrete of claim 9, in which the mixture comprises one or more adjuvants.

* * * * *